United States Patent [19]

Steinegger

[11] 4,152,141

[45] May 1, 1979

[54] METHOD OF REMOVAL OF ALKALI AND ALKALINE EARTH METALS FROM LIGHT METAL MELTS

[75] Inventor: Alfred Steinegger, Venthône, Switzerland

[73] Assignee: Swiss Aluminium Ltd., Chippis, Switzerland

[21] Appl. No.: 946,316

[22] Filed: Sep. 27, 1978

Related U.S. Application Data

[62] Division of Ser. No. 649,138, Jan. 14, 1976.

[30] Foreign Application Priority Data

Apr. 24, 1975 [CH] Switzerland .................... 5288/75

[51] Int. Cl.$^2$ .............................................. C22B 21/06
[52] U.S. Cl. ........................................ 75/68 R; 75/63
[58] Field of Search ................... 75/68 R, 93 R, 63

[56] References Cited

U.S. PATENT DOCUMENTS

| | | | |
|---|---|---|---|
| 3,281,238 | 10/1966 | Bachowski et al. | 75/68 R |
| 3,528,801 | 9/1970 | Bylund et al. | 75/68 R |

*Primary Examiner*—M. J. Andrews
*Attorney, Agent, or Firm*—Bachman and LaPointe

[57] ABSTRACT

Alkali and alkaline earth metals are removed from light metal melts by causing the melt to flow through a bed consisting of granules of a mechanically resistant and chemically inert carrier particles which have a coating of carbon. A suitable granule is prepared by mixing particles of inert carrier material with a cokable carbonaceous material and heating the mixture in a closed reaction vessel to produce an adherent coating of carbon on the carrier particles of the granules. The density of the coated granules is greater than 2.5 g/cm$^3$.

12 Claims, No Drawings

METHOD OF REMOVAL OF ALKALI AND ALKALINE EARTH METALS FROM LIGHT METAL MELTS

This is a division of application Ser. No. 649,138, filed Jan. 14, 1976.

The invention relates to methods of removal of alkali and alkaline earth metals from light metal melts, especially aluminium melts, by flowing the melt through a bed of granules having a coating of carbon; the granules themselves for carrying out these methods; and methods of manufacture of these granules.

In primary aluminium there are, surprisingly, significant amounts of alkali and alkaline earth metals, which in the case of sodium can attain values up to 0.0070% (70 ppm) although metals more electro positive than aluminium should not theoretically be found in the product of electrolysis, but should rather remain in ionic form in solution.

The alkali and alkaline earth metals are impurities and exert an extremely disturbing effect on highly purified aluminium, since they react almost instantaneously with moisture in the air, and the metal hydroxides which are thereby formed act corrosively on the aluminium. A high content of sodium manifests itself in a particularly disturbing way during the hot formation of those aluminium-based alloys in which the most important subsidiary constituent is magnesium, resulting in splitting of the edges of the bars during rolling and casting.

Therefore, methods have been sought for a long time for eliminating alkali and alkaline earth metals from light metals, or to reduce their concentration to tolerable values. Assuming that one can start from a total content of alkali-alkaline earth metals of 20 to 35 ppm in primary aluminium, this content must be reduced to 10 to 12 ppm in small bars, and to about 2 ppm in large bars. According to the state of the art, to achieve this, substantially three methods have been applied:

First, light metal melts are treated with gaseous chlorine, a treatment which eliminates alkali-alkaline earth metals as chlorides, a number of other reactions taking place simultaneously. With the aid of this method one is able, by a treatment of an aluminium melt with chlorine gas for six hours, to reduce a sodium content of 5.0 ppm to 1.0 ppm (U.S. Pat. Nos. 3,737,303 and 3,737,304). This procedure has the serious disadvantage that maintenance of the melt temperature during such a long period of time involves extraordinarily high heating costs, which decisively impairs the economy of the entire method. A further disadvantage of this method lies in the fact that gaseous chlorine also reacts to a significant extent with aluminium, and thus leads to a diminution of the yield of this metal. Moreover the aluminium chloride occurring in the waste gas of this method is a pollutant, so that expensive purifying and protective measures are needed. However the basic disadvantage of this method lies in the highly poisonous properties of gaseous chlorine, which endangers the environment and hence requires extraordinary and costly safety measures. The second method described in the state of the art for separation of alkali metal impurities from light metals consists in treating the light metal melt with carbon. It is not known at present whether the alkali metal is thereby eliminated by means of adsorption (chemisorption) on the surface of the carbon or by a chemical reaction. In the latter case again it is uncertain whether a salt-like carbide (acetylide) is formed according to one of the equations

$$2Me + 2C \rightarrow Me_2C_2 \qquad (1)$$

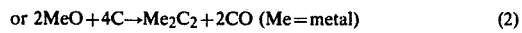

$$\text{or } 2MeO + 4C \rightarrow Me_2C_2 + 2CO \text{ (Me=metal)} \qquad (2)$$

or whether and to what extent one of the barely known metal-graphite compounds arises, described to be of a decided layer structure and having one of the following stoichiometric compositions: $NaC_8$ (brown) $NaC_{16}$ (grey) and $NaC_{60}$ (strongly graphitic). (See K. Fredenhagen, Z. Anorg. Allg. Chem. 158 (1926), 249–63).

In one such method, aluminium melts were filtered through a bed of petroleum coke particles (ethylene coke, acetylene coke), so that, according to reports, the sodium content was reduced in the aluminium melt by 50%. A particular advantage of this method lies in the extraordinarily low solubility of carbon in aluminium. Thus for example there is no recognisable solubility of coke in an aluminium melt up to 1100° C., and the working temperature of the method lies only between 700° and 800° C. (German OS No. 2,019,538).

On the other hand several operational disadvantages hamper the use of beds of carbon for elimination of alkali metals from light metal melts: Beds of petroleum coke have too small a mechanical resistance to the metallo-static pressure of a melt. Local deformation and formation of channels in the bed are the consequence, which in turn leads to a variable quality of the light metal product.

Another disadvantage is that calcined petroleum coke with a density of 1.5 to 1.7 g/cm$^3$ is significantly lighter than an aluminium melt having a density of 2.1 to 2.51 g/cm$^3$ (U.S. Pat. No. 3,281,238).

In order that the filter bed shall not in consequence float on the melt, its particles must be fixed from above, which in turn produces various operational problems in loading and unloading the filter particles in heated condition. This problem is further accentuated by the optional passing of gas through the bed, which still further increases the danger of disruption of the bed.

Attention must also be paid to the fact that it is difficult in some circumstances to obtain particles of coke which are free from finer carbon particles, which easily lead to the filter bed baking together. This results in a significant reduction of the filtering speed of the metal melt.

The object of the present invention was to develop methods for removal of alkali and alkaline earth metals from light metal melts, which on the one hand take full advantage of carbon in treatment of the melt, and on the other hand avoid the drawbacks of a treatment of the melt with gaseous chlorine or in a loose bed of petroleum coke.

The third method described in the state of the art for elimination of alkali-alkaline earth metals makes use of a treatment of the melt with salts. Although it is not even certain whether this method is appropriate for reducing the content of impurities to the desired value of 2 ppm, reference should also be made to the significant operational disadvantages of this method: the quantities of salt necessary for it are, in continuous operation, at least twice as expensive as a bed of coke, and with the necessary frequent renewal of the salts there arises the problem of disposal of the residues, which is particularly evidenced if sodium fluoride is used, whose poisonous properties make it a severe pollutant and danger to factory workers.

In a method according to the present invention, the melt is caused to flow through a bed consisting of particles of a mechanically resistant and chemically inert carrier material, which have a coating of carbon.

In a method of manufacture of a coated granulate according to the present invention, particles of a mechanically resistant and chemically inert carrier material are mixed with a cokable carbonaceous binding material and the mixture is heated in a closed reaction vessel to produce coking of the carbonaceous material and production of an adherent coating of carbon on the particles of the carrier material.

Preferably the coated granulate has a density greater than The cokable material containing carbon may consist at least partly of coal tar pitch, pulverised coal, petroleum coke, or graphite.

The carrier particles may consist at least partly of corundum, magnesite, zirconium oxide, zirconium silicate, basalt, or bauxite.

If one subjects a commercial coal tar pitch or other cokable carbonaceous material in the presence of particles of inert ceramic material to a coking process, it has been found surprisingly that the carbonaceous material becomes almost entirely deposited on the ceramic particles, providing the particles with a hard coating of pure carbon, the thickness of which depends on the one hand on the proportional masses of the reacting materials, and on the other hand on how often the procedure is repeated with recycled coated particles. Further possibilities of variation of the method arise from the fact that the hardness and the surface properties of the carbon layer can be optimized by suitable choice of the two reaction parameters of temperature and time.

The particles obtained in this way unite in themselves all the advantages of the physical-chemical reaction ability of carbon with alkali and alkaline earth metals, and the mechanical properties of conventional ceramic particles. If, for example, corundum is used as carrier material, then the coated particles have a density of 3.5 g/cm$^3$ to 4.0 g/cm$^3$, depending on the thickness of the applied carbon coating. This high density prevents the particles from floating totally or partially on the light metal melt to be filtered. The coating of carbon has preferably a thickness of 0.1 to 10 mm.

In addition, the coated particles have the mechnical strength of the carrier material employed, which with conventional ceramic materials makes possible a high loading by metallostatic pressure, without risk of deforming the bed and decreasing the quantity of light metal melt flowing.

Surprisingly, if reaction conditions of the coating process are suitably chosen, the carbon layer appears totally compact, and so hard that, even in the charging process of the particles into the filter housing, no fine carbon particles (carbon dust) are rubbed off. A clean particle of this kind has the advantage over conventional petroleum coke that no danger exists that the bed when heated will sinter together owing to the presence of fine carbon particles and consequently become choked.

Surprisingly it has been found that, with such hard glasslike carbon coatings on a ceramic carrier material, effects can be attained in the elimination of alkali metals from light metal melts which at least equal those of porous petroleum coke, and, given the optimum conduct of the method, even overtake them. With the particles according to the invention, one can be certain of reducing the sodium concentration of an aluminium melt under routine conditions in each treatment by about one third. Similar decreases in the amount of calcium are achieved. The influence of non-reactive gas conveyed in counter-current through the melt on the elimination of alkali metal is not totally clear. Nevertheless it is established that it contributes significantly to the method, without which the high elimination figures of alkali metal cannot be achieved. This non-reactive gas may, for example, consist of nitrogen, or an inert gas such as argon, or a mixture of nitrogen and one or more inert gases, or a mixture of inert gases. The non-reactive gas may contain 1 to 3 percent by volume of an aliphatic chloro-fluoro hydrocarbon.

The separation of alkali and alkaline earth metal from a light metal melt is carried out preferably in a filter housing containing a bed of carbon-coated particles. The housing is made to open upwards and is provided with an inlet for the light metal melt to be treated. In the neighbourhood of its floor, the filter housing has at least one outlet opening for the melt, and the floor is provided with one or more gas-permeable and fire-resistant bricks containing a connection for non-reactive gas. An electrical resistance heater, an induction coil, or a commercial oil burner can be provided as a heating device. Preferably the filter housing, which is insulated on the exterior, is provided with a lid, and the latter is provided with an adjustable heating device. An outlet arranged on the filter housing serves for example for conveying the purified melt onwards to a continuous casting plant.

Below there is given one operational example for the manufacture of carbon-coated particles and one for the separation of alkali metal from a light metal melt.

EXAMPLE 1

Manufacture of carbon coated filter granules 5 kg of finely ground coal tar pitch of maximum particle diameter 2 mm, and 50 kg of particles of porous corundum of largest diameter 0.5 to 10 cm (for special purposes up to 25 cm) were arranged, in alternating layers of about 2 cm thickness each, in a reaction vessel of ceramic material the inner surface of which was coated with a layer of graphite, and the reaction mixture was heated during 2 to 12 hours at 750° to 1200° C. with exclusion of air. After cooling, 52 kg of a black granulate were obtained the individual particles of, which had a carbon coating of mean thickness 0.5 to 1 mm, and which could be separated from one another without difficulty. This method was, according to the intended use of the particles, if necessary repeated several times. Using corundum as a carrier material, the coated products always had densities between 3.5 g/cm$^3$ and 4.1 g/cm$^3$.

The product showed no loosely adhering carbon particles and could be heated to the working temperature of 700° to 720° C. without noticeable loss of carbon. After prolonged use for separation of alkali or alkaline earth metals from light metal melts, the particles could be regenerated by the method indicated.

In place of corundum, alternatively magnesite, zirconium oxide, zirconium silicate, or basalt can be employed wholly or partly as carrier material. The carrier material can also consist at least partly of bauxite. Instead of being arranged in layers, the carrier material and melted cokable material containing carbon may be mixed together as thoroughly as possible.

EXAMPLE 2

Elimination of alkali and alkaline earth metals from light metal melts

A filter housing of fire resistant material with a capacity of about 40 kg of metal was employed for the separation of alkali and alkaline earth metals from aluminium melts. The melt treated had the following composition (apart from the alkali-alkaline earth metal impurities tabulated later):

| Elements | Cu | Fe | Mg | Si | Mn | Zn | Al |
|---|---|---|---|---|---|---|---|
| % by weight | 0.05 | 0.3 | 3.0 | 0.4 | 0.3 | 0.1 | remainder |

The melt when in the furnace had a temperature of 720° to 740° C., and flowed through the filter housing in time with the admission of melt into the inlet. The temperature in the filter amounted to 710° C., and an average throughout of 4 t/h of melt was achieved.

Before the filtration of the light metal melt, the carbon-coated particles were charged cold into the filter housing, and was then heated over a period of two hours to a temperature of about 720° C. by means of a conventional oil burner built into the cover of the housing.

During filtering, argon was blown through the light metal melt in counter-current at 33 to 55 liters per minute per m² cross section of the filter bed.

In comparative experiments on the same melt, using conventional filter granules of corundum, using the carbon-coated particles of the present invention, and using particles of ethylene coke (acetylene coke) as control, the concentrations of alkali and alkaline earth metal given below were found. The particles were 1.0 to 1.5 cm in diameter, so that in all the experiments approximately the same effective surface was achieved for the reaction. In all examples, a mean throughput of 4 t/h of melt was established, and the temperature in the filter housing amounted constantly to 710° to 720° C. The concentrations of impurities were determined by a known method of atomic absorption spectroscopy.

| Experimental conditions | Elements ppm | | |
|---|---|---|---|
| | Na | Ca | Li |
| 1. Conventional particles of corundum | | | |
| before treatment | 17 | 10 | 4 |
| after treatment | 16 | 9 | 4 |
| 2. Particles of petroleum coke | | | |
| before treatment | 23 | 8 | 3 |
| after treatment | 11 | 5 | 2 |
| 3. Carbon-coated particles according to the invention | | | |
| before treatment | 21 | 9 | 3 |
| after treatment | 6 | 3 | 1 |

I claim:
1. A method of removal of alkali and alkaline earth metals from light metal melts which comprises establishing a coated granule bed consisting essentially of particles of mechanically inert carrier material having an adherent coating thereon of carbon, wherein the density of the coated granules is greater than 2.5 g/cm³, and causing said melt to flow through the bed.
2. A method according to claim 1 wherein said melt is aluminum.
3. A method according to claim 1 wherein said inert carrier material has an adherent coating thereon of carbon 0.1 mm. to 10 mm. thick.
4. A method according to claim 1 including the step of causing a non-reactive gas to traverse the melt in counter-current relationship to the melt.
5. A method according to claim 4 wherein said gas is nitrogen.
6. A method according to claim 4 wherein said gas consists of at least one inert gas.
7. A method according to claim 6 wherein said gas contains 1 to 3 percent by volume of an aliphatic chloro-fluoro hydrocarbon.
8. A method according to claim 1 wherein the inert carrier particles are between 0.5 to 25 cm. in diameter.
9. A method according to claim 1 wherein the inert carrier material is an inert ceramic material.
10. A method according to claim 1 wherein the carrier is selected from the group consisting of corundum, magnesite, zirconium oxide, zirconium silicate, basalt, and bauxite.
11. A method according to claim 1 wherein the inert carrier is corundum and wherein the density of the coated granules is from 3.5 to 4.0 g/cm³.
12. A method according to claim 1 wherein the carbon coating is compact and wherein the coated particles are characterized by the absence of sintering together when arranged in a heated bed.

* * * * *

UNITED STATES PATENT AND TRADEMARK OFFICE
CERTIFICATE OF CORRECTION

PATENT NO. : 4,152,141
DATED : May 1, 1979
INVENTOR(S) : Alfred Steinegger

It is certified that error appears in the above-identified patent and that said Letters Patent are hereby corrected as shown below:

In the Abstract, penultimate line, change "granules" to ---granulate---.

In Column 3, line 15, change "granulate" to ---particles have---.

In Column 3, line 15, delete "has".

In Column 3, line 16, after "than" insert ---2.5 g/cm$^3$.---.

In Column 3, line 16, "The cokable material . . ." should be a new paragraph.

In Column 3, line 47, change "mechnical" to ---mechanical---.

In Column 5, line 46, change "experiments" to ---examples---.

In Column 5, line 48, change "examples" to ---experiments---.

In Column 6, before the table, insert the following paragraph:
---Table: Concentration of alkali and alkaline earth elements in aluminium melts upon filtration through different materials.---.

In Column 6, line 19, claim 1, after "mechanically" insert ---resistant and chemically---.

Signed and Sealed this

Second Day of October 1979

[SEAL]

Attest:

RUTH C. MASON
Attesting Officer

LUTRELLE F. PARKER
Acting Commissioner of Patents and Trademarks